(12) United States Patent
Yoshii et al.

(10) Patent No.: US 7,339,781 B2
(45) Date of Patent: Mar. 4, 2008

(54) ELECTRONIC COMPONENT AND ELECTRONIC DEVICE

(75) Inventors: Akitoshi Yoshii, Yurihonjou (JP); Taisuke Ahiko, Nikaho (JP); Masumi Miyairi, Tokyo (JP); Akio Kikuchi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/347,367

(22) Filed: Feb. 6, 2006

(65) Prior Publication Data

US 2006/0193103 A1 Aug. 31, 2006

(30) Foreign Application Priority Data

Feb. 28, 2005 (JP) .......................... P2005-054739

(51) Int. Cl.
*H01G 4/228* (2006.01)

(52) U.S. Cl. .................................. 361/309; 361/306.3

(58) Field of Classification Search ........ 361/303–305, 361/311–313, 306.1, 306.3, 308.1, 308.2, 361/309

See application file for complete search history.

(56) References Cited

U.S. PATENT DOCUMENTS

| | | | |
|---|---|---|---|
| 5,561,587 A * | 10/1996 | Sanada | 361/306.1 |
| 5,712,758 A * | 1/1998 | Amano et al. | 361/321.2 |
| 5,995,360 A * | 11/1999 | Hata et al. | 361/321.5 |
| 2001/0055192 A1* | 12/2001 | Nakano et al. | 361/306.3 |
| 2002/0001712 A1* | 1/2002 | Higuchi | 428/336 |
| 2002/0040624 A1* | 4/2002 | Nakamura et al. | 75/252 |

FOREIGN PATENT DOCUMENTS

| JP | 2001210545 A * | 8/2001 |
|---|---|---|
| JP | A 2002-203736 | 7/2002 |

* cited by examiner

*Primary Examiner*—Eric Thomas
(74) *Attorney, Agent, or Firm*—Oliff & Berridge, PLC

(57) ABSTRACT

An electronic component having an element body, and a terminal electrode disposed on the element body. The terminal electrode has a first electrode layer, a second electrode layer, and a third electrode layer. The first electrode layer is formed on an external surface of the element body and formed by baking of a conductive paste. The second electrode layer is formed by Ni plating on the first electrode layer. The third electrode layer is formed by Sn plating or Sn alloy plating on the second electrode layer. A thickness of the second electrode layer is set in a range of not less than 5 μm, and less than 8 μm.

2 Claims, 4 Drawing Sheets

Fig.3

|  | THICKNESS OF SECOND ELECTRODE LAYERS | INSULATION RESISTANCE IR BEFORE ACCELERATED TEST | INSULATION RESISTANCE IR AFTER ACCELERATED TEST |
|---|---|---|---|
| SAMPLE 1 | 3 μm | $1.3 \times 10^8 \Omega$ | $5.8 \times 10^5 \Omega$ |
| SAMPLE 2 | 4 μm | $1.3 \times 10^8 \Omega$ | $9.5 \times 10^7 \Omega$ |
| SAMPLE 3 | 5 μm | $1.3 \times 10^8 \Omega$ | $1.2 \times 10^8 \Omega$ |
| SAMPLE 4 | 6 μm | $1.3 \times 10^8 \Omega$ | $1.3 \times 10^8 \Omega$ |
| SAMPLE 5 | 7 μm | $1.3 \times 10^8 \Omega$ | $1.3 \times 10^8 \Omega$ |
| SAMPLE 6 | 8 μm | $1.3 \times 10^8 \Omega$ | $1.3 \times 10^8 \Omega$ |

Fig.4

|  | THICKNESS OF SECOND ELECTRODE LAYERS | PRESENCE/ABSENCE OF OCCURRENCE OF PEELING |
|---|---|---|
| SAMPLE 7 | 3 μm | ABSENT |
| SAMPLE 8 | 4 μm | ABSENT |
| SAMPLE 9 | 5 μm | ABSENT |
| SAMPLE 10 | 6 μm | ABSENT |
| SAMPLE 11 | 7 μm | ABSENT |
| SAMPLE 12 | 8 μm | PRESENT |

ELECTRONIC COMPONENT AND ELECTRONIC DEVICE

BACKGROUND OF THE INVENTION

1. Field of the Invention

The present invention relates to an electronic component and an electronic device.

2. Related Background Art

An example of the known electronic components of this type is one provided with an element body and terminal electrodes disposed on the element body (e.g., reference is made to Japanese Patent Application Laid-Open No. 2002-203736). The electronic component described in the Laid-Open No. 2002-203736 is a multilayer ceramic capacitor, in which the terminal electrodes are disposed on the external surface of the element body. Each of the terminal electrodes has a first electrode layer formed by baking of a conductive paste, a second electrode layer formed by Ni plating on the first electrode layer, and a third electrode layer formed by Sn plating or Sn alloy plating on the second electrode layer.

SUMMARY OF THE INVENTION

An object of the present invention is to provide an electronic component and an electronic device capable of suppressing occurrence of deterioration of insulation resistance under a high-temperature and high-humidity environment and preventing peeling of the terminal electrodes due to a thermal shock.

In response to the demands for environmental protection, solders containing no lead, i.e., lead-free solders are being used in recent years, for mounting an electronic component on a substrate by soldering. Solders consisting primarily of Sn predominate among the lead-free solders. The lead-free solders in use include Sn—Ag—Cu solders, Sn—Cu solders, Sn—Sb solders, Sn—Zn—Al solders, and Sn—Zn—Bi solders. The recent trend is that Sn—Zn solders with excellent solderability (solder wettability) and with excellent soldering strength are often adopted as the lead-free solders.

Then the Inventors studied various characteristics of electronic components mounted on a substrate with the lead-free solders containing Zn by experiment and found the new fact that the insulation resistance heavily deteriorated under a high-temperature and high-humidity environment.

The Inventors prepared an electronic device in which a multilayer ceramic capacitor was mounted on a substrate with an Sn—Zn—Al solder, and conducted an accelerated test for the electronic device. The multilayer ceramic capacitor as an object of the accelerated test was a multilayer ceramic capacitor of the 2012 type (2.0 mm long, 1.2 mm wide, and 1.0 mm high). As the multilayer ceramic capacitor described in the Laid-Open No. 2002-203736 was, the multilayer ceramic capacitor as an object of the accelerated test was provided with the terminal electrodes each having the first electrode layer formed by baking of a conductive paste containing Cu, the second electrode layer formed by Ni plating on the first electrode layer, and the third electrode layer formed by Sn plating on the second electrode layer.

The accelerated test was to continuously apply the DC voltage of 4.0 V to the electronic device (multilayer ceramic capacitor) in a constant temperature and humidity environment (temperature: 121° C., relative humidity: 95%, pressure: 2 atm) for forty hours. The insulation resistance of the multilayer ceramic capacitor before the accelerated test was $1 \times 10^8$ Ω. In contrast to it, the insulation resistance of the multilayer ceramic capacitor after passage of a predetermined time (two or more hours) from the accelerated test was $1 \times 10^6$ Ω, with deterioration of the insulation resistance. The B characteristic of the multilayer ceramic capacitor as an object of the accelerated test was 10 μF.

The Inventors analyzed the multilayer ceramic capacitor having demonstrated the deterioration of insulation resistance after the accelerated test, and confirmed the fact that Zn atoms contained in the lead-free solder existed in the boundary region between the second electrode layer and the third electrode layer. It is inferred from this fact that Zn atoms contained in the lead-free solder migrate into the element body of the multilayer ceramic capacitor for some reason to cause the deterioration of insulation resistance. Therefore, we can deduce that the deterioration of insulation resistance can also be prevented by suppressing the migration of the Zn atoms in the lead-free solder into the element body.

Then the Inventors also conducted elaborate research on electronic components capable of suppressing the occurrence of deterioration of insulation resistance under the high-temperature and high-humidity environment. As a result, the Inventors came to find the new fact that the occurrence of deterioration of insulation resistance under the high-temperature and high-humidity environment can be suppressed by increasing the thickness of the second electrode layer. Namely, the migration of the Zn atoms in the lead-free solder into the element body is considered to be suppressed by increasing the thickness of the second electrode layer.

Incidentally, the second electrode layer is formed by Ni plating. For this reason, the increase in the thickness of the second electrode layer would increase stress in the second electrode layer and could cause peeling of the second electrode layer (terminal electrodes) with application of a thermal shock to the second electrode layer.

In view of this fact, an electronic component according to the present invention is an electronic component comprising an element body, and a terminal electrode disposed on the element body, wherein the terminal electrode has a first electrode layer formed on an external surface of the element body and formed by baking of a conductive paste, a second electrode layer formed by Ni plating on the first electrode layer, and a third electrode layer formed by Sn plating or Sn alloy plating on the second electrode layer, and wherein a thickness of the second electrode layer is set in a range of not less than 5 μm, and less than 8 μm.

In the electronic component according to the present invention, the thickness of the second electrode layer is set in the range of not less than 5 μm, which can suppress the occurrence of deterioration of insulation resistance under the high-temperature and high-humidity environment. In addition, the thickness of the second electrode layer is set in the range of less than 8 μm, which can prevent peeling of the terminal electrode due to the thermal shock.

An electronic device according to the present invention comprises the foregoing electronic component, and a substrate on which a wiring pattern is disposed, wherein the terminal electrode of the electronic component is electrically and mechanically connected to the wiring pattern disposed on the substrate, with a lead-free solder containing Zn.

In the electronic device according to the present invention, the thickness of the second electrode layer of the electronic component is set in the range of not less than 5 μm, which can suppress the occurrence of deterioration of insulation resistance under the high-temperature and high-humidity environment. The thickness of the second electrode layer of the electronic component is set in the range of less than 8 μm, which can prevent the peeling of the terminal electrode due to the thermal shock.

The present invention successfully provides the electronic component and electronic device capable of suppressing the occurrence of deterioration of insulation resistance under the high-temperature and high-humidity environment and preventing the peeling of the terminal electrode due to the thermal shock.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a table showing the measurement results of insulation resistance before and after an accelerated test.

FIG. 4 is a table showing the results of a thermal shock test.

DESCRIPTION OF THE PREFERRED EMBODIMENTS

A preferred embodiment of the present invention will be described below in detail with reference to the accompanying drawings. In the description identical elements or elements with identical functionality will be denoted by the same reference symbols, without redundant description. The present embodiment is an example in which the present invention is applied to a multilayer ceramic capacitor.

Figure 1:
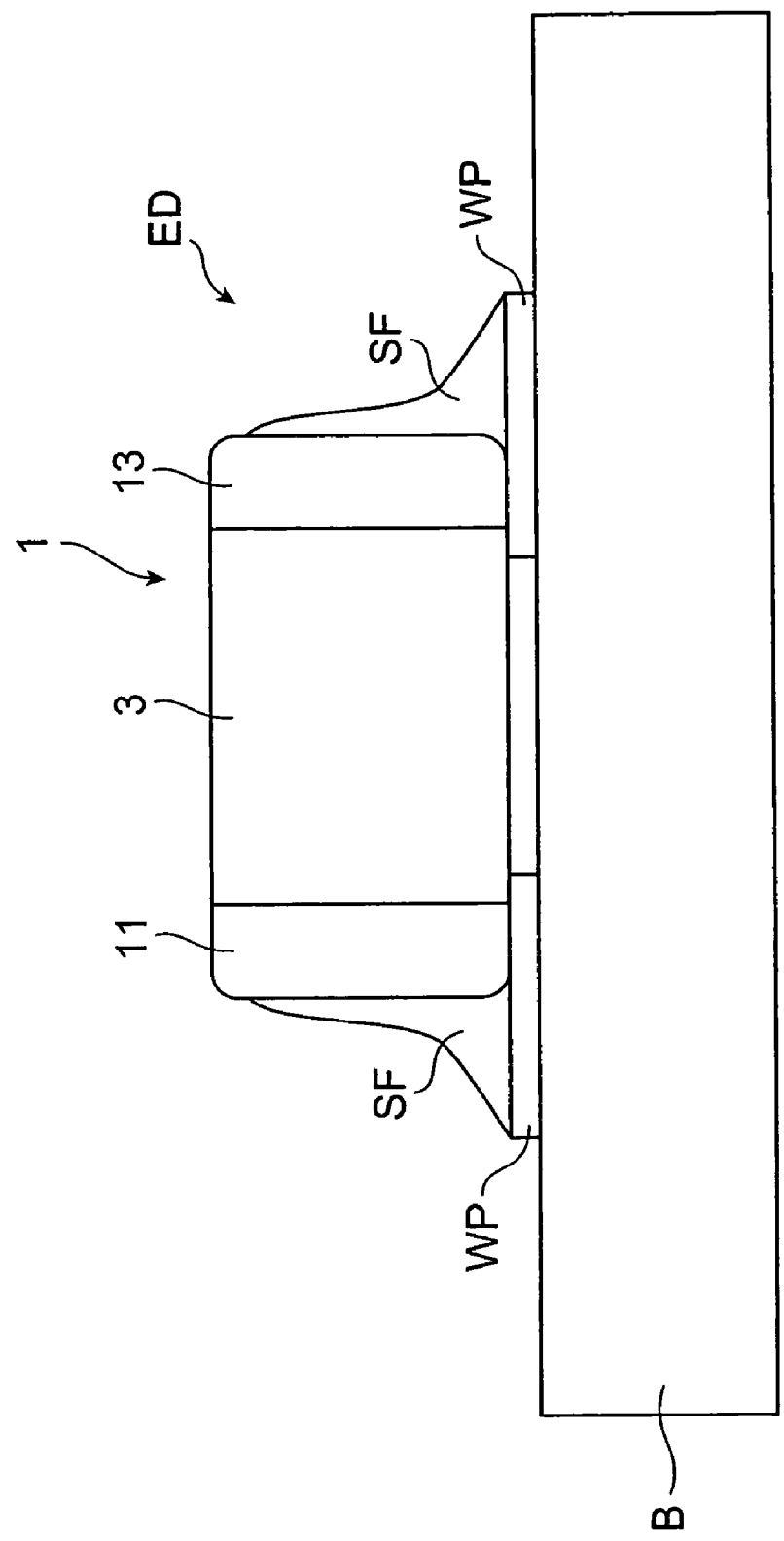
FIG. 1 is a schematic view showing a configuration of an electronic device according to an embodiment of the present invention.
Figure 2:
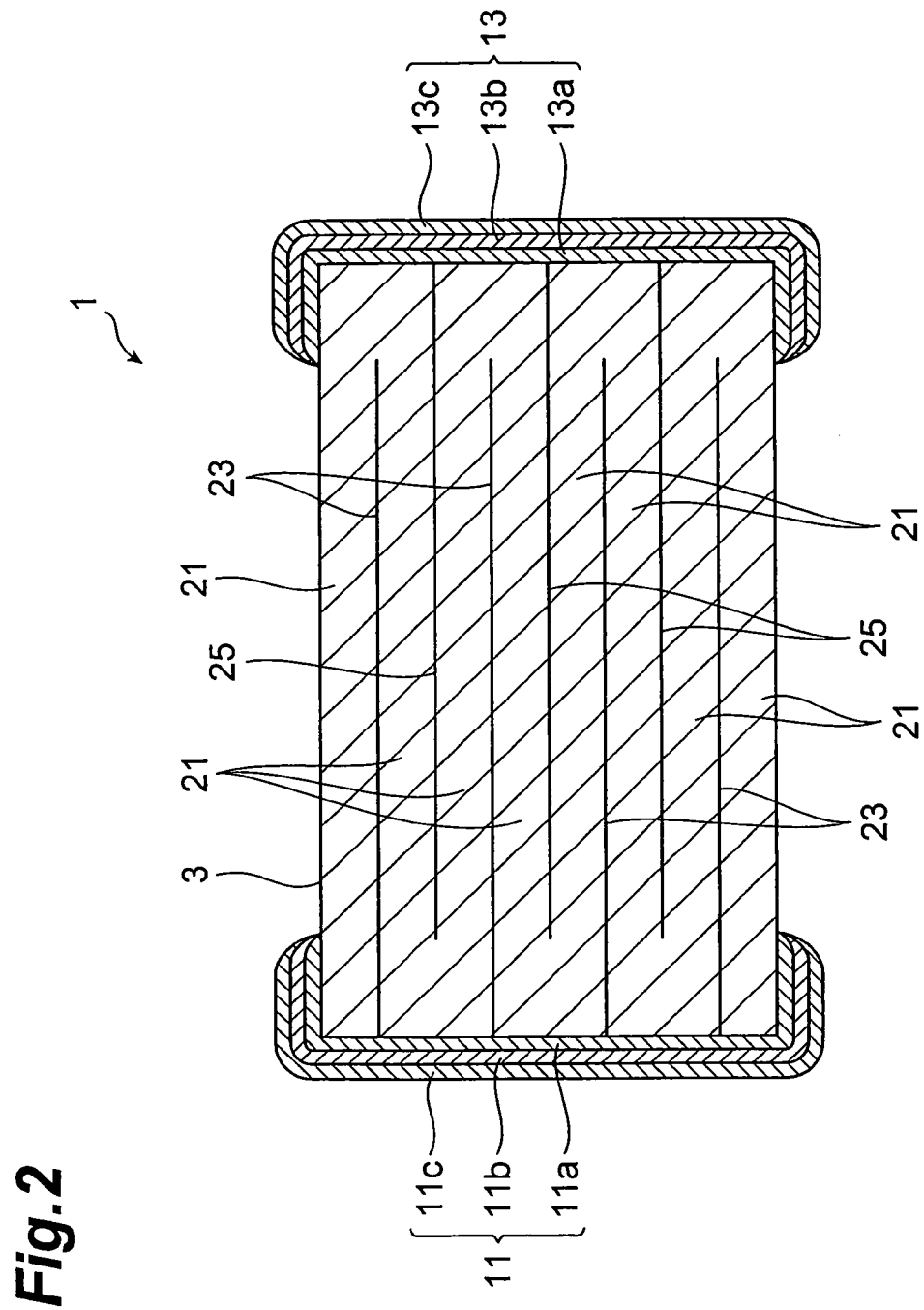
FIG. 2 is a schematic view showing a sectional configuration of a multilayer ceramic capacitor according to an embodiment of the present invention.

A configuration of an electronic device ED according to the present embodiment will be described with reference to FIGS. 1 and 2. FIG. 1 is a schematic view showing the configuration of the electronic device according to the present embodiment. FIG. 2 is a schematic view showing a sectional configuration of a multilayer ceramic capacitor according to the present embodiment.

The electronic device ED, as shown in FIG. 1, has a multilayer ceramic capacitor 1 as an electronic component, and a substrate B on which a wiring pattern WP is disposed. The multilayer ceramic capacitor 1 has a capacitor element body 3 of rectangular parallelepiped shape, and a pair of terminal electrodes 11, 13. The multilayer ceramic capacitor 1 is a multilayer ceramic capacitor of the 2012 type (2.0 mm long, 1.2 mm wide, and 1.0 mm high).

The multilayer ceramic capacitor 1 is mounted on the substrate B by soldering the pair of terminal electrodes 11, 13 to the wiring pattern WP, in a state in which the pair of terminal electrodes 11, 13 are electrically and mechanically connected to the wiring pattern WP. In this soldering, a solder fillet SF is formed across each terminal electrode 11, 13 and the wiring pattern WP. A solder used in the soldering is a lead-free solder containing Zn. The present embodiment adopts an Sn—Zn solder and, particularly, an Sn—Zn—Bi solder. An Sn—Zn—Al solder may also be used instead of the Sn—Zn—Bi solder.

The soldering can be performed by so-called reflow. Specifically, the multilayer ceramic capacitor 1 is mounted on a solder paste preliminarily applied onto the wiring pattern WP on the substrate B, and thereafter the entire electronic device ED is heated to not less than the melting temperature of the solder, to melt the solder and fix the device.

The capacitor element body 3, as shown in FIG. 2, is constructed in the configuration in which first internal electrodes 23 and second internal electrodes 25 are alternately laminated with dielectric layers 21 in between. In the actual multilayer ceramic capacitor 1, the dielectric layers 21 are integrally formed so that no boundary can be visually recognized between the dielectric layers 21. In the present embodiment, the capacitor comprised of the first internal electrodes 23, second internal electrodes 25, and dielectric layers 21 is an internal circuit element.

The pair of terminal electrodes 11, 13 are disposed on the external surface of the capacitor element body 3. More specifically, the capacitor element body 3 has a pair of end faces extending along the direction of thickness of capacitor element bodies 3 (the laminating direction of the first internal electrodes 23 and second internal electrodes 25) and facing each other. One terminal electrode 11 is formed on one of the pair of end faces, so as to cover the entire region of the one end face. The other terminal electrode 13 is formed on the other end face out of the pair of end faces, so as to cover the entire region of the other end face.

The first internal electrodes 23 are of rectangular shape. The first internal electrodes 23 are disposed at positions a predetermined distance apart from the other end face, and extend so as to face the one end face. In this configuration, the first internal electrodes 23 are drawn out to the one end face and are electrically connected to one terminal electrode 11.

The second internal electrodes 25 are of rectangular shape. The second internal electrodes 25 are disposed at positions a predetermined distance apart from the one end face and extend so as to face the other end face. In this configuration, the second internal electrodes 25 are drawn out to the other end face and are electrically connected to the other terminal electrode 13.

The dielectric layers 21 are layers consisting primarily of $BaTiO_3$ and are formed by firing ceramic green sheets containing $BaTiO_3$. The first and second internal electrodes 23, 25 are electrode layers consisting primarily of Ni. The first and second internal electrodes 23, 25 may be electrode layers consisting primarily of Pd, Ag—Pd, Cu, or a Cu alloy.

Each of the pair of terminal electrodes 11, 13 has a first electrode layer 11a, 13a, a second electrode layer 11b, 13b, and a third electrode layer 11c, 13c.

The first electrode layer 11a, 13a is formed on the external surface (the end face) of the capacitor element body 3 and formed by baking of a conductive paste. The thickness of the first electrode layer 11a, 13a is set in the range of 5 to 200 μm and, in the present embodiment, it is set at about 9 μm. The present embodiment adopts a conductive paste obtained by mixing a glass frit and an organic vehicle in metal powder consisting primarily of Cu. The metal powder may be one consisting primarily of Ni, Ag—Pd, or Ag.

The second electrode layer 11b, 13b is formed by Ni plating on the first electrode layer 11a, 13a. The thickness of the second electrode layer 11b, 13b is set in the range of not less than 5 μm, and less than 8 μm. The Ni plating can be conducted by barrel plating using an Ni plating bath (e.g., Watts nickel bath).

The third electrode layer 11c, 13c is formed by Sn plating on the second electrode layer 11b, 13b. In the present embodiment, the thickness of the third electrode layer 11c, 13c is set at about 3 μm. The Sn plating can be performed by barrel plating using an Sn plating bath (e.g., Sn neutral plating bath). The third electrode layer 11c, 13c may be formed by Sn alloy plating.

Now let us detail the relationship of the thickness of the second electrode layer 11b, 13b with the insulation resistance deterioration and thermal shock resistance of the multilayer ceramic capacitor 1.

The Inventors conducted the experiment described below, in order to clarify the relationship between the thickness of the second electrode layer 11b, 13b and the insulation resistance IR. Specifically, we prepared six samples (Samples 1-6) of the multilayer ceramic capacitors different in the thickness of the second electrode layers 11b, 13b, performed an accelerated test in a state in which each Sample 1-6 was mounted on a substrate by soldering (reflow), and measured each of insulation resistances IR before and after the accelerated test of each Sample 1-6. The measurement results are presented in the table of FIG. 3. In this experiment, the different thicknesses of the second electrode layers 11b, 13b were implemented by adjusting the plating time.

In the accelerated test, the DC voltage of 4.0 V was continuously applied to each Sample 1-6 in a constant temperature and humidity environment (temperature: 121° C., relative humidity: 95%, pressure: 2 atm) for forty hours. The insulation resistances after the accelerated test were values measured after passage of a predetermined time (two or more hours) from the accelerated test. Each of Samples 1-6 had the same configuration as the multilayer ceramic capacitor 1 of the above-described embodiment, except for the difference in the thickness of the second electrode layers 11b, 13b, and was designed so as to achieve the B characteristic of 10 μF. The composition of the Sn—Zn—Bi solder used in the soldering was Sn: 89 wt %, Zn: 8 wt %, Bi: 3 wt %. The reflow was conducted by use of a reflow furnace, while setting the ambient temperature in the furnace at 230-250° C. and setting a passage time through the furnace to 4-6 minutes.

It is apparent from the measurement results shown in FIG. 3 that the occurrence of insulation resistance deterioration is more suppressed with increase in the thickness of the second electrode layers 11b, 13b. In the case of Sample 2 in which the thickness of the second electrode layers 11b, 13b is 4 μm, the insulation resistance IR after the accelerated test is $9.5 \times 10^7$ Ω, which is significantly smaller than $1.3 \times 10^8$ Ω being the insulation resistance IR before the accelerated test. In contrast to it, in the case of Sample 3 in which the thickness of the second electrode layers 11b, 13b is 5 μm, the insulation resistance IR after the accelerated test is $1.2 \times 10^8$ Ω, which is nearly equal to $1.3 \times 10^8$ Ω being the insulation resistance IR before the accelerated test. Therefore, the lower limit of the thickness of the second electrode layers 11b, 13b is 5 μm.

Next, the Inventors conducted the experiment described below, in order to clarify the relationship between the thickness of the second electrode layers 11b, 13b and the thermal shock resistance. Namely, we prepared six samples (Samples 7-12) of multilayer ceramic capacitors different in the thickness of the second electrode layers 11b, 13b, performed a thermal shock test in a state in which each Sample 7-12 was mounted on a substrate by soldering (reflow), and checked the presence/absence of occurrence of peeling in the terminal electrodes 11, 13 after the thermal shock test of each Sample 7-12. The check results are presented in the table of FIG. 4. Each of Samples 7-12 had the same configuration as the multilayer ceramic capacitor 1 of the above-described embodiment, except for the difference in the thickness of the second electrode layers 11b, 13b, and was designed to achieve the B characteristic of 10 μF. The composition of the Sn—Zn—Bi solder used in the soldering, and the reflow conditions were the same as in the accelerated test. In this experiment, the different thicknesses of the second electrode layers 11b, 13b were implemented by adjusting the plating time.

In the thermal shock test, each Sample 7-12 mounted on the substrate was subjected to 1000 thermal treatment cycles, each cycle consisting of step (i) to step (iv) below. Specifically, one thermal treatment cycle consists of (i) a step of keeping the substrate and each Sample 7-12 under a temperature condition that the temperature of the capacitor element body is −55° C., for 30 minutes; (ii) a step of raising the temperature of the capacitor element body to 125° C. within a time (3 minutes) equal to 10% of the above retention time; (iii) a step of keeping the substrate and each sample under a temperature condition that the temperature of the capacitor element body is 125° C., for 30 minutes; (iv) a step of decreasing the temperature of the capacitor element body to −55° C. within a time (3 minutes) equal to 10% of the above retention time.

It is apparent from the measurement results shown in FIG. 4 that the thermal shock resistance is excellent in the small range of the thickness of the second electrode layers 11b, 13b. With Sample 12 in which the thickness of the second electrode layers 11b, 13b is 8 μm, peeling was confirmed in the terminal electrodes 11, 13 after the thermal shock test. In contrast to it, with Samples 7-11 in which the thickness of the second electrode layers 11b, 13b is not more than 7 μm, no peeling was recognized in the terminal electrodes 11, 13 after the thermal shock test. Therefore, the upper limit of the thickness of the second electrode layers 11b, 13b is less than 8 μm.

In the present embodiment, as described above, the thickness of the second electrode layers 11b, 13b formed by Ni plating is set to not less than 5 μm, which can suppress the occurrence of deterioration of insulation resistance under the high-temperature and high-humidity environment. In addition, the thickness of the second electrode layers 11b, 13b is set to less than 8 μm, which can prevent the peeling of the terminal electrodes 11, 13 due to the thermal shock.

The preferred embodiment of the present invention was described above in detail, but the present invention is by no means limited to the above embodiment. For example, the numbers of layers of the dielectric layers 21, first internal electrodes 23, and second internal electrodes 25 are not limited to the numbers illustrated. The multilayer ceramic capacitor 1 does not have to be limited to the aforementioned 2012 type, but may be a multilayer ceramic capacitor larger than the 2012 type or a multilayer ceramic capacitor smaller than the 2012 type.

The present invention does not have to be limited to the multilayer ceramic capacitors, but may also be applied to any electronic component comprising an element body, and a terminal electrode disposed on the element body, e.g., capacitors, thermistors, varistors, and composite electronic components containing them.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A device including:
   an electronic component and
   a lead-free solder containing Zn to mount the electronic component to a substrate;
   the electronic component comprising an element body, and a terminal electrode disposed on the element body,
   wherein the terminal electrode has:
   a first electrode layer formed on an external surface of the element body and formed by baking of a conductive paste;
   a suppression electrode layer to prevent a migration of Zn atoms contained in the lead-free solder into the element body, the suppression electrode layer formed by Ni plating on the first electrode layer; and
   a second electrode layer formed by Sn plating or Sn alloy plating on the suppression electrode layer, and
   wherein a thickness of the first electrode layer is set in a range of 5 µm to 200 µm, and
   a thickness of the suppression electrode layer is set in a range of greater than 6 µm, and less than 8.

2. An electronic device comprising:
   an electronic component comprising an element body, and a terminal electrode disposed on the element body; and
   a substrate on which a wiring pattern is disposed,
   wherein the terminal electrode of the electronic component is electrically and mechanically connected to the wiring pattern disposed on the substrate, with a lead-free solder containing Zn, and
   wherein the terminal electrode includes:
   a first electrode layer formed on an external surface of the element body and formed by baking a conductive paste;
   a second electrode layer to prevent a migration of Zn atoms contained in the lead-free solder into the element body; and
   a third electrode layer formed by Sn plating or Sn alloy plating on the second electrode layer,
   wherein a thickness of the first electrode layer is set in a range of 5 to 200 µm, and
   wherein a thickness of the second electrode layer is set in a range of greater than 6 µm, and less than 8 µm.

* * * * *